United States Patent [19]

Maejima

[11] 3,892,955

[45] July 1, 1975

[54] PROGRAM CONTROLLED TESTING SYSTEM

[75] Inventor: Tsugie Maejima, Gyoda, Japan

[73] Assignee: Takeda Riken Kogyo Kabushiki Kaisha, Tokyo, Japan

[22] Filed: Feb. 22, 1974

[21] Appl. No.: 445,044

[30] Foreign Application Priority Data

Feb. 26, 1973 Japan .................... 48-22899

[52] U.S. Cl. .................... 235/153 AC

[51] Int. Cl. .................... G11c 29/00

[58] Field of Search235/153 AC, 153 AK, 153 AM; 324/73 R; 340/172.5

[56] References Cited

UNITED STATES PATENTS

| | | | |
|---|---|---|---|
| 3,519,808 | 7/1970 | Lawder | 235/153 AC |
| 3,631,229 | 12/1971 | Bens et al. | 235/153 AC |
| 3,633,174 | 1/1972 | Griffin | 235/153 AC |
| 3,719,929 | 3/1973 | Fay et al. | 340/172.5 |
| 3,751,649 | 8/1973 | Hart, Jr. | 235/153 AC |
| 3,812,426 | 5/1974 | Illian | 324/73 R |
| 3,813,032 | 5/1974 | King | 235/153 AC |

*Primary Examiner*—Charles E. Atkinson
*Attorney, Agent, or Firm*—Sughrue, Rothwell, Mion, Zinn and Macpeak

[57] ABSTRACT

A program controlled testing system for a device or component comprises a program control unit which supplies an instruction for addressing a device or component to be tested. An output data is obtained from the device, and is compared against a reference data contained in the instruction. The comparison result controls the address to which the program of the program control unit is to be advanced. The address for specifying the device or a particular location thereof to be tested is stored in an address register, while the reference data is stored in a reference data register. A comparison circuit compares the content of the reference data register against the output data. A test is possible even when the time interval from the addressing operation of the device to be tested until a determination processing for the comparison result is effected is greater than one cycle time of the testing system.

8 Claims, 30 Drawing Figures

PROGRAM CONTROLLED TESTING SYSTEM

BACKGROUND OF THE INVENTION

The invention relates to a system preferred for use as a testing system for an integrated semiconductor storage unit, and more particularly to such a testing system which operates under the control of a program.

In a conventional system for testing a storage unit implemented on an integrated semiconductor, the test comprises specifying an address within the device, writing a reference data into that address location, reading out the stored data, comparing the output data read out therefrom with the reference data which is retained in the form before the write-in takes place, determining if the comparison result proves to be non-defective or defective, advancing the program counter one step to effect the following program step in response to a non-defective output data, and effecting an accommodating processing for the defect when the comparison result proves to be defective. The accommodating processing for the defective unit requires a time period of definite length, so that when a cycle time is established, this restricts the varieties of the memory units which can be tested depending upon the length of the access time thereof. Thus, a storage unit having a longer access time can not be tested with such system. If it is desired to test a storage unit having a longer access time, the cycle time must be extended. On the other hand, it will be appreciated that a storage unit can be tested at the maximum rate if both the access and determination can be completed within one cycle time at the maximum rate of the storage unit. However, storage units having the same maximum rate or one cycle period, but having an access time which occupies a relatively greater proportion thereof such that the sum of the access time and the time period required for the determination exceeds one cycle time at the maximum rate of the storage units, can no longer be tested. In this instance, the testing cycle time must be increased to operate the storage units at a rate less than its maximum rate, thus resulting in an increased testing period. By way of example, when testing an integrated semi-conductor storage unit having the capacity of 1000 bits, the number of accesses required amounts to at least one million times or usually four million times, so that it will be appreciated that an increase in the time per access, even if it is small by itself, results in a considerably increased overall testing time and an inefficient operation.

Therefore, it is an object of the invention to provide a program controlled testing system which operates at a high overall speed.

It is another object of the invention to provide a program controlled testing system capable of testing storage units having a relatively long access time such that the sum of the access time and the time period required for the determination of the comparison result exceeds one cycle time of the testing system.

It is a further object of the invention to provide a program controlled testing system capable of testing storage units while operating them at their maximum rate.

It is an additional object of the invention to provide a program controlled testing system capable of testing storage units having an access time which is as long as one cycle time.

It is still another object of the invention to provide a testing system which is controlled by a microprogram to permit a display of the address of a defective location and to permit an analysis of the defect to be effected in a facilitated manner.

SUMMARY OF THE INVENTION

In accordance with the invention, a reference data is stored in a buffer memory, and the stored reference data is compared against an output data from a device to be tested. This permits a comparison to be effected when the access time, that is a time period including a specifying of an address, followed by writein of data and read-out of the data, is relatively long, since the reference data is retained. During the time a delayed output data is compared with the stored reference data and a processing for the comparison result is effected, an addressing, a data entry, readout thereof and the like can contemporaneously be effected, thereby reducing the overall testing time. Thus a high speed testing is rendered possible.

DETAILED DESCRIPTION OF THE INVENTION

Figure 1:
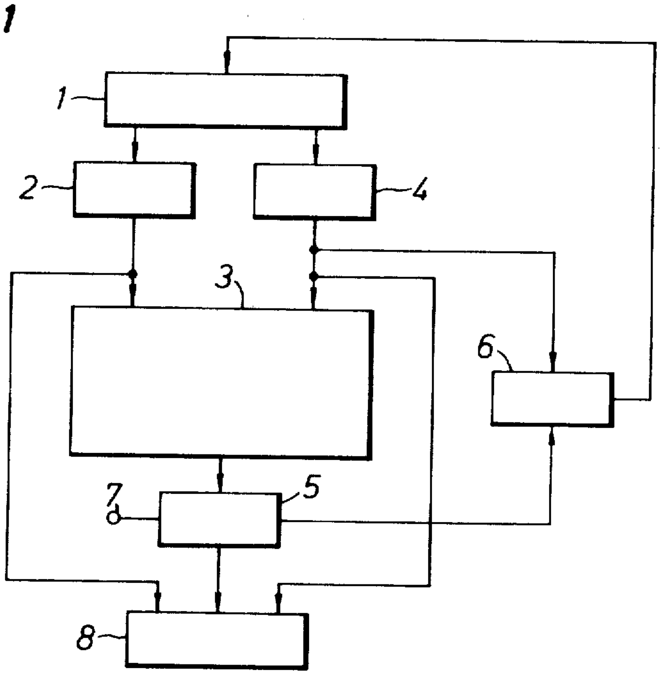
FIG. 1 is a block diagram showing one example of a conventional program controlled testing system.

Referring to the drawings, FIG. 1 shows a conventional program controlled testing system which may be constructed in a similar manner as disclosed in U.S. Pat. No. 3,751,649 issued on Aug. 7, 1973. Specifically, the system comprises a microprogram control unit 1 including an instruction register for receiving an instruction from the microprogram. An address contained in the instruction is applied to an address unit 2, and thence to a device 3 to be tested, such as a semiconductor storage unit, for the purpose of accessing. A reference data contained in the instruction is written into the accessed address location from a data generator 4. The data entered is immediately read out to be stored in an output data memory 5, and its content is compared with the reference data in the data generator 4 in a comparison circuit 6. When the comparison result proves to be non-defective, that is, when a coincidence occurs between the both contents, a program counter in the microprogram control unit 1 is advanced one step. On the other hand, when the comparison result proves to be defective, that is, in the event of non-coincidence between the both contents, the current execution of the microprogram control unit 1 is interrupted, and a defect processing is initiated, which may result in a transfer instruction.

Figures 2A, 2B, 2C, 2D, 2E:
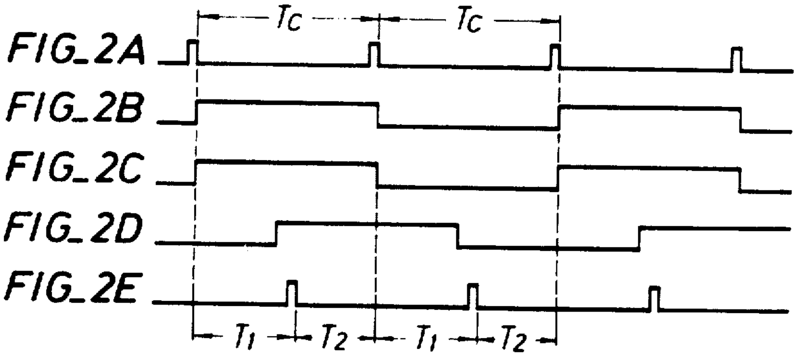
FIGS. 2A to 2E are a series of timing charts for illustrating the operation of the system of FIG. 1.

Referring to the timing chart shown in FIG. 2, during one cycle time Tc of the microprogram control unit 1, shown in FIG. 2A, an addressing and the generation of the reference data take place as shown in FIGS. 2B and 2C, respectively. An entry into and readout from the storage unit 3 to be tested as well as the comparison with the reference data occur during a period $T_1$ which commences with the end of a clock pulse defining the cycle time. When the comparison result proves to be defective, a defect processing takes place during another period $T_2$ which spans from the end of the period $T_1$ to the next cycle time, and the microprogram control during the next cycle time depends on the result of the processing. FIG. 2D shows an output data read out from the storage unit, and FIG. 2E shows a comparison clock applied to a terminal 7 shown in FIG. 1 for enabling a comparison between the output data and the reference data. The alternation of the waveforms shown in FIGS. 2B, 2C and 2D between 0 and 1 for successive cycle times signifies that the respective contents change every cycle time.

From the above description, it will be appreciated that in a conventional system, processings to a single address location are all effected within one cycle time Tc of the microprogram control unit 1, thus restricting the write-in and read-out of the data as well as the comparison to within a period represented by $T_1$ because a definite period of time $T_2$ is required for the defect processing. As a result, when a cycle time Tc is established, storage units having an access time which exceeds a given value can no longer be tested. When the sum of $T_1$ and $T_2$ exceeds one cycle time at the maximum rate of the storage unit 3, the cycle time Tc must be increased, thereby precluding a testing of the storage unit at its maximum rate.

In the conventional testing system described above, the address specified by the address unit 2 and the reference data generated by the data generator 4 are adapted to be displayed by a panel display 8. Since such display changes in seriatim in accordance with the content of the program counter within the microprogram control unit 1, it follows that, when a defective output is obtained from a storage unit 3 being tested, the address and reference data corresponding to such defect are already lost. When it is desired to locate the defective address, the flow chart must be traced to determine the location where the testing system has operated to detect a non-coincidence, thus resulting in a troublesome procedure.

Figure 3:
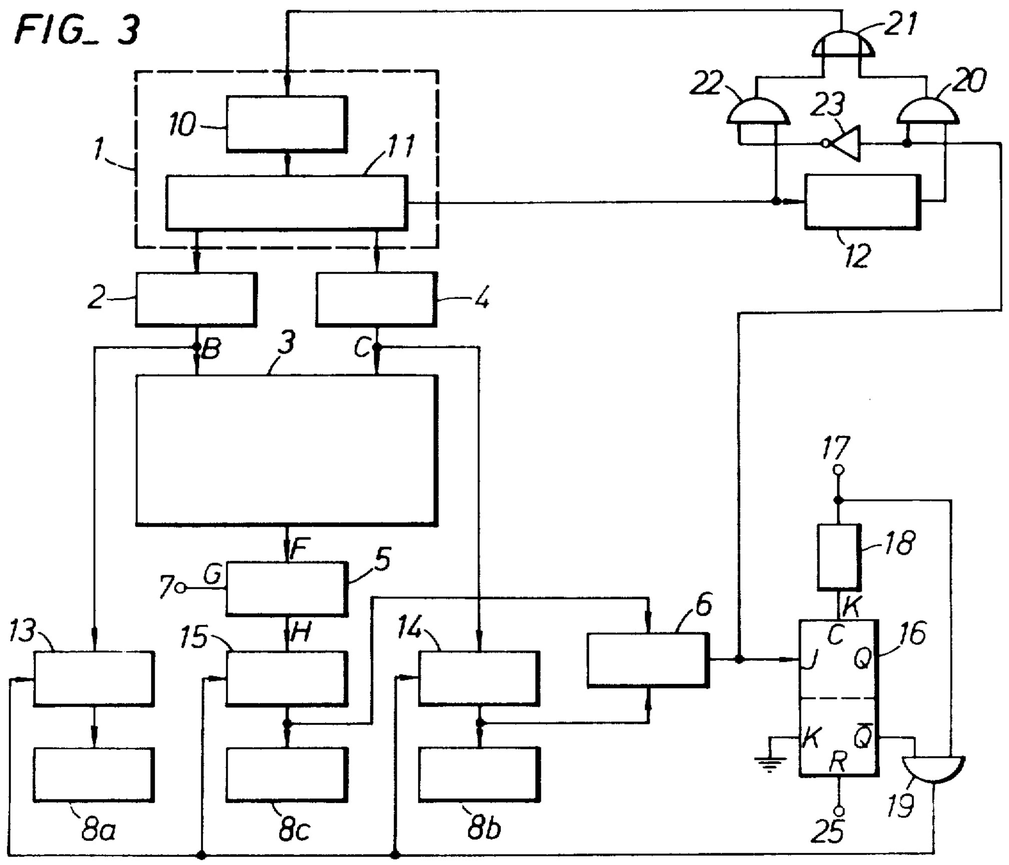
FIG. 3 is a block diagram of one embodiment of the program controlled testing system according to the invention.

Now one embodiment of the program controlled testing system according to the invention will be described below with reference to FIG. 3. In this Figure, corresponding parts are designated by like numerals as in FIG. 1. The program control unit 1 includes a program counter 10 which functions to access a microprogram memory 11 also contained therein to read out an instruction therefrom. An address contained in the instruction is supplied to the address unit 2 while a reference data is supplied to the data generator 4. It is to be noted that a transfer address is supplied to a transfer address register 12 with a delay of one cycle time. The address contained in the address unit 2 is stored in an address register 13 while the reference data from the data generator 4 is stored in a reference data register 14. Using the address contained in the address unit 2, a storage unit 3 to be tested is accessed, and the reference data from the data generator 4 is written into the specified address location. Subsequently, the entered data is read out, the resulting output data being stored in the output data memory 5. The content of the output data memory 5 is stored in an output data register 15, the output of which is compared against the reference data from the reference data register 14 in the comparison circuit 6.

The comparison circuit 6 may be constructed in a number of ways, but can be constructed in a manner such that an exclusive logical sum of corresponding bits from the both data to be compared is formed, and then a logical sum of respective outputs is formed to provide an output of 1 when a non-coincidence occurs for any bit position, and to provide an output of 0 when a coincidence applies with respect to all of the bits. The comparison output is supplied to a J terminal of a JK flipflop which forms a display inhibit circuit 16. The flipflop 16 includes a clock terminal C to which a cycle time clock from the microprogram control unit 1 is applied from a terminal 17 through a delay circuit 18. A logical product of Q output of the flipflop 16 and the clock from the terminal 17 is formed by an AND circuit 19, the output of which enables an entry of new data into the registers 13 to 15. The output from the comparison circuit 6 is also supplied to a gate circuit 20 so that when the comparison output is 1, the output of the transfer address register 12 which stores a transfer address is supplied through the gate circuit 20 and through an OR circuit 21 to the program counter 10. In addition to a transfer required of the program counter 10 in response to a defect processing, a transfer may also be necessary during the normal operation when the comparison output is 0 for the purpose of executing a microprogram, and such transfer is supplied to the program counter 10 through a gate circuit 22 and the OR circuit 21. The gate circuit 22 is enabled by a gate signal which is a negation output from the comparison circuit 6 supplied through a circuit 23. The contents of the registers 13 to 15 are adapted to be displayed by panel displays 8*a* to 8*c*, respectively.

Figures 4A, 4B, 4C, 4D, 4E, 4F, 4G, 4H, 4I, 4J, 4K, 4L:
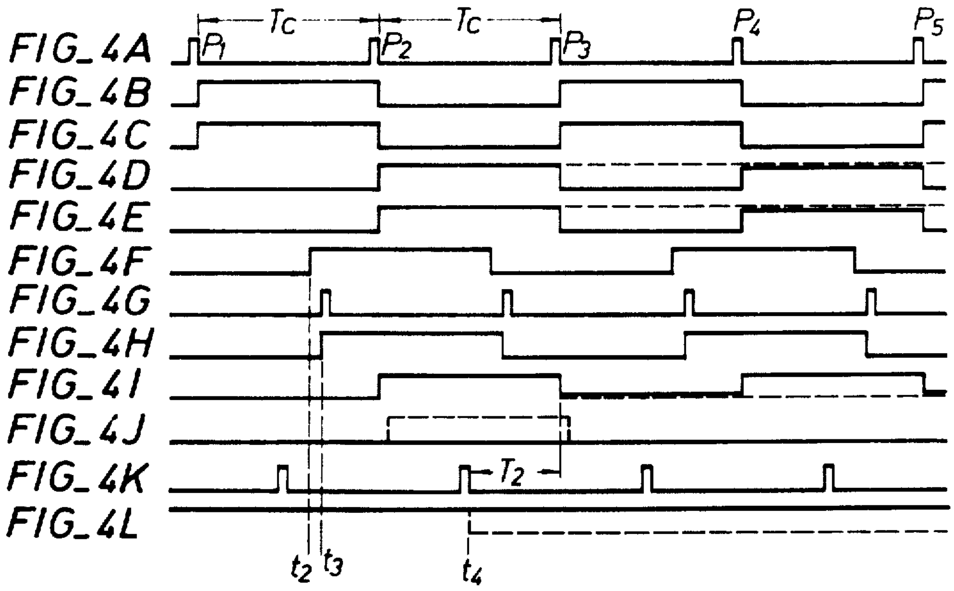
FIGS. 4A to 4L are a series of timing charts for illustrating the operation of the system shown in FIG. 3.

For each cycle time clock (FIG. 4A) of the microprogram control unit 1, an address is entered into the address unit 2 and a reference data is established in the data generator 4, as shown in FIGS. 4B and 4C, respectively, and the reference data is written into a storage unit 3 to be tested at the address specified and is subsequently read out. For example, during a cabel time beginning with a clock $P_1$, the output data shown in FIG. 4F which is obtained at time $t_2$ is stored into the output data memory 5 as shown in FIG. 4H, at time $t_3$, by a comparison reference clock (FIG. 4G). Upon occurrence of the next cycle time clock $P_2$, the address contained in the address unit 2 at that time (see FIG. 4B) and the reference data from the data generator 4 (see FIG. 4C) are stored into the registers 13 and 14, respectively, as shown in FIGS. 4D and 4E, and the output data from the output data memory 5 is stored into the output data register 15 as shown in FIG. 4I. Then the reference data in the register 14 is compared with the output data from the output register 15 by the comparison circuit 6, and the resulting comparison output will be 0 as shown in solid line in FIG. 4J when a coincidence occurs for the respective bits. At time $t_4$, the flipflop 16 is triggered by a clock delayed by the delay circuit 18 (see FIG. 4K). Its Q output remains to be 1, whereby a new data is entered into the registers 13, 14 and 15 at the next clock $P_3$.

However, if a non-coincidence occurs even for one bit during the comparison between the output data and the reference data, the output from the comparison circuit 6 will be 1 as indicated in dotted line in FIG. 4J, so that at time $t_4$ when the delayed clock from the delay circuit 18 is applied, the output from the Q output terminal of the flipflop 16 will be 0 as shown in dotted line in FIG. 4L. As a result, the gate 19 is closed to prevent the clock from being supplied to the registers 13 to 15, so that the address, reference data and output data which prevailed before the occurrence of the clock $P_2$ or during the cycle time beginning with the clock $P_1$ remain stored in the registers 13 to 15 and displayed by the displays 8*a* to 8*c*. When the output from the comparison circuit 6 changes to 1, the gate 20 is opened, whereby a transfer address contained in the instruction of the microprogram which has been read out during a previous cycle time, that is during the cycle time beginning with the clock $P_1$ is supplied to the program counter 10 to load the transfer address into this counter, thereby allowing a processing to be performed in accordance with the transfer instruction.

In this manner, in the testing system according to the invention, a defect processing is not performed within the same cycle time as the one in which an operation for deriving an output data is effected, but is offset therefrom, and this permits a testing of a storage unit having a slow access time. Because during the time the data comparison and defect processing take place during one cycle time, an operation for deriving an output data from the next address location proceeds, the testing speed remains the same as in a case in which an output data is derived and the data comparison and a defect processing are effected all within one cycle time. In this manner, it is assured that storage units having a rapid or a slow access time may equally be tested at the maximum available cycle time thereof, thus reducing the testing time.

When a defective storage unit is detected or when the output from the comparison circuit 6 becomes 1, the execution of the current instruction is inhibited, and in addition, the defective address location as well as its associated reference data and output data remain in the registers 13 to 15 to thereby enable them to be displayed by the displays 8*a* to 8*c*, thus facilitating an analysis of the defect. A processing to accommodate for the defect can be effected under the control of a microprogram. Referring to FIG. 3, at the start of the test, a start signal is applied to a terminal 25 to reset the flipflop 16, which provides an output of 1 at its Q output terminal. By extending the storage by the registers 13 to 15 over a plurality of cycle times, the time interval from the addressing to obtaining the comparison output may be further increased. Conversely, a high speed processing with a reduced cycle time is possible.

Figure 5:
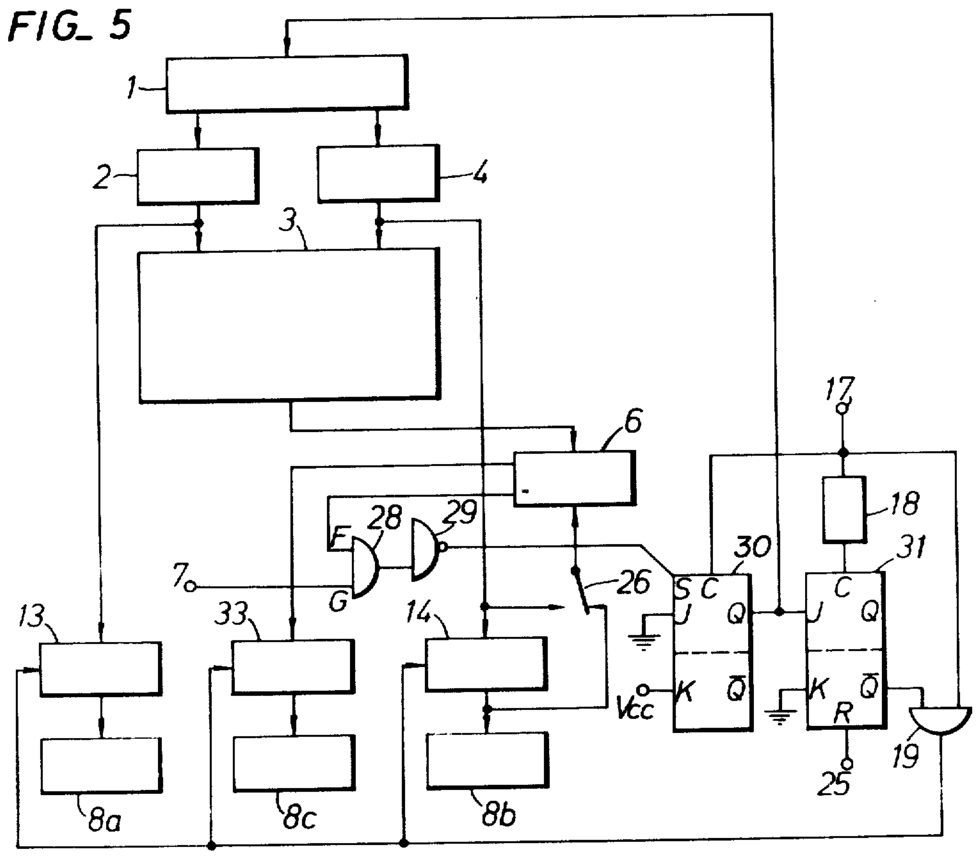
FIG. 5 is a block diagram of another embodiment of the program controlled testing system according to the invention.
Figures 6A, 6B, 6C, 6D, 6E, 6F, 6G, 6H, 6I, 6J:
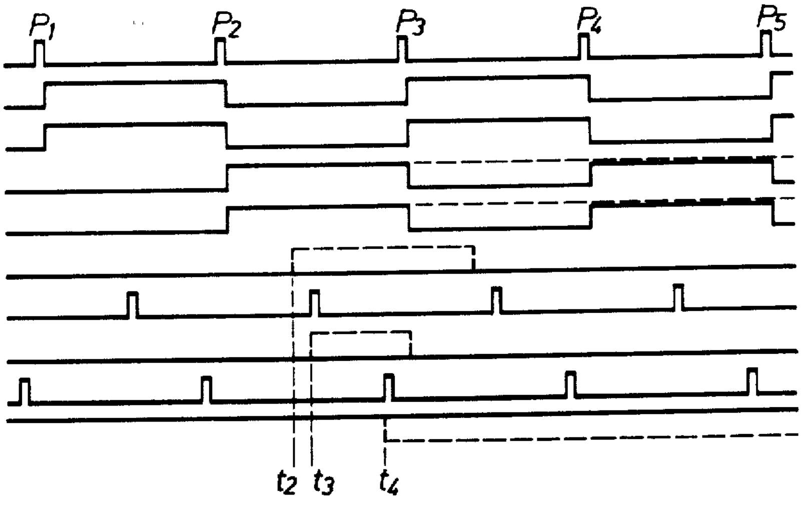
FIGS. 6A to 6J are a series of timing charts for illustrating the operation of the system shown in FIG. 5.

While in the foregoing description, a comparison clock has been produced within the same cycle time as that during which an addressing is effected, the time interval from the addressing to the comparison may be increased beyond one cycle time. Such a modification is shown in FIG. 5 wherein corresponding parts are designated by like numerals as in FIG. 3. The timing chart for illustrating the operation of the system shown in FIG. 5 is shown in FIG. 6. Referring to FIGS. 5 and 6, upon the occurrence of a cycle time clock $P_1$ shown in FIG. 6A, a reference data (FIG. 6C) from the data generator 4 is entered into an address location (FIG. 6B) specified by the address unit 2, and the data is read out therefrom. When the next cycle time clock $P_2$ occurs, the address specified by the address unit 2 is stored into the register 13 and the reference data from the data generator 4 is stored into the register 14, as shown in FIGS. 6D and 6E, respectively. The content of the reference register 14 is supplied to the comparison circuit 6 through a switch 26, and is compared with an output data from a storage unit 3 to be tested, which is obtained subsequent to the cycle time clock $P_2$. When a non-coincidence occurs even for one bit in the comparison result, the output will be 1 from time $t_2$ on, as shown in dotted lines in FIG. 6F. The 1 output is applied to a gate 28 which is enabled by a comparison clock (FIG. 6G) applied to the terminal 7 at time $t_3$, thus supplying the output to an inverter 29. The inverter produces an output of 0, which sets a flipflop 30. As a consequence, the Q output of the flipflop 30 will be 1 as shown in dotted lines in FIG. 6H. Since the flipflop 30 receives 0 and 1 at its J and K inputs, respectively, the next cycle time clock $P_3$ supplied from the terminal 17 will render its Q output to 0. A Q output of 1 from the flipflop 30 represents a defect detection signal, which interrupts the execution of the program within the microprogram control unit 1. The defect processing in this example is to interrupt the operation of the program control unit 1, and the interruption takes place within the cycle time during which a defect is detected. The Q output of 1 from the flipflop 30 which is produced when a defect detection signal is obtained is applied to the J input of a flipflop 31 having a clock terminal C to which the clock from the terminal 17 is applied through the delay circuit 18. As indicated in FIG. 6I, this pulse is delayed with respect to the pulse shown in FIG. 6G, but is advanced with respect to the following cycle time clock $P_3$. When this pulse is applied to the flipflop 31, this flipflop is set to 1 which is applied to its J input at time $t_4$, whereby its Q output becomes 0. As shown in FIG. 6J, this Q output of 0 closes the gate 19, thereby preventing a new entry into the registers 13, 14 and 33 and maintaining the previous content therein.

Such an arrangement permits the time interval from the addressing to obtaining the comparison result may be as long as within twice the cycle time. This is particularly useful when it takes a relatively long period of time from the addressing until an output data is obtained, for example, when the storage unit 3 has a relatively long overall access time because of the long distance between the storage unit 3 and the microprogram control unit 1, the slow access operation itself, or the delays involved with the drive circuit connected from the address unit 2 and the data generator 4 to the storage unit 3 to be tested or the drive circuit connected from the unit 3 to the comparison circuit 6. In the present example, when the occurrence of a defect is detected, the corresponding comparison result is displayed in the display 8*c*. The comparison result from the comparison circuit 6 is stored in a comparison result register 33 by means of an output pulse from the gate 19, and subsequently the content of the register 33 is displayed by the display 8. When the time interval from the addressing until an output data is obtained is less than one cycle time Tc, a switch 26 may be changed so as to be connected with the data generator 4, thereby permitting the reference data to be directly used in the comparison without being stored in the register 14. It should be noted that the curves in FIG. 6 which are shown in solid lines represent an operation in which a coincidence occurs for every bit during the comparison by the comparison circuit 6.

While in the foregoing description, the invention has been described as applied to a testing system for storage units, it should be understood that the invention can equally be applied to the testing of devices or units which can be addressed and can produce an output corresponding to the addressed location.

Having thus described the invention, what is claimed is:

1. A program controlled testing system including a microprogram control unit, an address unit for storing an address contained in an instruction read out from the microprogram control unit, a reference data generator for storing a reference data, said address being used to access a storage unit to be tested to enter the reference data into the storage unit at said address, and an output data memory for storing an output data which is read out from the storage unit at said address for subsequent comparison of the output data with the reference data; the system comprising:

an address register into which the content of the address unit is entered;

a reference data register into which the content of the reference data generator is entered;

an output data register into which the content of the data memory is entered;

a comparator for comparing the content of the reference data register and the content of the output data register;

means for performing the entry into the address register; the reference data register and the output data register, respectively, at a time later than the entry into the address unit, and entry inhibit means for inhibiting said entry in response to a non-coincident output from the comparator.

2. A program controlled testing system according to claim 1, further including a display for displaying the content of the address register, another display for displaying the content of the reference data register, and a further display for displaying the content of the output data register.

3. A program controlled testing system according to claim 1, further including a transfer address register in which a transfer address contained in the instruction read out from the microprogram control unit is entered at a time later than the occurrence of the instruction, and means for entering the content of the transfer address register into a program counter within the microprogram control unit in response to a non-coincident output from the comparator.

4. A program controlled testing system according to claim 1 in which the means for inhibiting read-in comprises a delay circuit for delaying a cycle time clock by an interval not greater than one cycle time, a flipflop for receiving an output from the comparison circuit and for receiving an output from the delay circuit as a clock thereto, and a gate adapted to receive the cycle time clock and to be enabled by an output from the flipflop.

5. A program controlled testing system including a microprogram control unit, an address unit for storing an address contained in an instruction read out from the microprogram control unit, a reference data generator for storing a reference data, a storage unit to be tested being accessed with the address to enter the reference data into the storage unit at the address, the entered data being subsequently read out from the storage unit as an output data which is compared with the reference data; the system comprising:

an address register into which the content of the address unit is entered;

a reference data register into which the content of the reference data generator is entered;

a comparator for comparing the content of the reference data register and the output data read out from the storage unit to be tested;

means for performing the entry into the address register and the reference data register at a time later than the entry into the address unit;

means for detecting a comparison result of the comparator at a time further later than the entry by the first mentioned means; and means for inhibiting the entry in response to an output from the last mentioned means which indicates a non-coincidence of the comparison.

6. A program controlled testing system according to claim 5, further including a comparison result register for storing the result from the comparator simultaneously with the read-in into the address register.

7. A program controlled testing system according to claim 5, further comprising means for halting the operation of the microprogram control unit in response to an output from the entry inhibit means.

8. A program controlled testing system according to claim 5, further comprising switching means for supplying the content of the reference data generator to the comparator in place of the content of the reference data register.

* * * * *